United States Patent Office 2,796,421
Patented June 18, 1957

2,796,421

PROCESS OF MAKING ALKYL PYRIDINES

Robert J. Zellner, Marinette, Wis., assignor to Ansul Chemical Company, Marinette, Wis., a corporation of Wisconsin No Drawing. Application September 26, 1955,
Serial No. 536,783

3 Claims. (Cl. 260—290)

This invention relates to a process for the production of alkyl pyridines. More specifically, this invention relates to the vapor phase interaction of ammonia and a selected aliphatic ketone in the presence of a highly active contact catalyst to produce a valuable pyridine derivative. The process of this invention is especially useful for producing 2,4,6-trimethylpyridine.

Pyridine and its alkyl homologs have long been recognized as important intermediates in the synthesis of dyestuffs, pharmaceuticals, insecticides and the like as well as having valuable applications per se as solvents. These bases are commonly obtained as by-products from coal tar production, but when derived from this source are either relatively impure or are purified by difficult and/or costly procedures. Methods of synthesis of pyridine homologs, other than obviously impractical classical procedures, have been confined to condensation reactions of ammonia with acetylene, alcohol, ketones and aldehydes. For the most part little progress has been made with these reactions because of the formation of mixtures of pyridines and pyridine derivatives and various by-products. In addition, when operating according to the prior art, relatively low yields of individual products have usually been obtained.

It is an object of this invention to provide a novel process for the production of substituted pyridines. It is another object of this invention to provide a process for the production of substituted pyridines that eliminates the difficulties of the prior art processes. It is still another object of this invention to condense a ketone and ammonia in the presence of a catalyst for this reaction. Another object of this invention is to provide a novel process for the production of 2,4,6-trimethylpyridine from a boiling ketone and ammonia. It is a further object of this invention to provide a novel process for the production of 2,4,6-trimethylpyridine of high purity and substantially free from the contaminants normally found in the coal tar derived product.

My invention comprises essentially the passage of a selected vaporized aliphatic ketone in admixture with ammonia with or without an inert diluent over a catalyst at suitable conversion temperatures. I have found it advantageous to use a weight ratio of acetone/ammonia between 10/1 and 2/1, and preferably between 4/1 and 6/1. A suitable catalyst is a silica-alumina catalyst similar to that used for petroleum cracking. An alumina content ranging between 5% and 50% by weight and 95% to 50% by weight silica is satisfactory. An alumina content of 7% to 25% by weight in the catalyst is a preferred range. The catalyst may be employed in any suitable form, as for example, granules, pellets, powders or fragments of regular or irregular contour and of workable size. The process is carried out at substantially atmospheric pressure at 300° C. to over 550° C. with operation at about 450° C. being preferred.

The following examples will illustrate certain of the numerous possible specific embodiments of the invention. It will be understood that the examples are intended to be illustrative of the invention and not limitations thereon as it is more broadly disclosed and claimed herein.

A series of runs was made in an electrically heated reactor 1½ inches in diameter with an effective catalyst depth of 34½ inches. The catalyst was a synthetic 13% alumina 87% silica product supplied as ⅛ inch diameter by ⅛ inch long extrusions. Acetone and ammonia were fed into the top of the reactor via separate superheaters. The crude product was condensed with a stainless steel heat exchanger. Enough flake sodium hydroxide (generally ⅓ the total weight of condensate) was added to saturate the water layer of the condensate. The oil was drawn off, filtered if necessary, and fractionally distilled at atmospheric pressure. The acetone not used in the reaction was recovered below 58° C. and recycled to the feed system. The main body of 2,4,6-trimethylpyridine was collected at 167–169° C. (uncorrected). Identification was made through the picrate (M. P. 153–156° C.) and the picrolonate (M. P. 230° C.). The distillate was analyzed by infra-red adsorption and a purity of 94% to 97% 2,4,6-trimethylpyridine was demonstrated. No. 3,5-dimethylpyridine (the usual contaminant in coal tar derived material) was found. By comparison, the best commercially available material (claimed to be 97% by the supplier) assayed at 91% and a technical grade product indicated about 60% 2,4,6-trimethylpyridine content. These experiments are summarized in the following Table I:

*Table I*

| Sample No. | 1 | 2 | 3 | 4 | 5 | 6 | 7 | 8 | 9 | 10 |
|---|---|---|---|---|---|---|---|---|---|---|
| Feed Rate [1]: | | | | | | | | | | |
| Acetone | 505 | 348 | 628 | 628 | 644 | 665 | 920 | 920 | 340 | 318 |
| Ammonia | 95 | 134 | 114 | 121 | 64 | 110 | 165 | 115 | 131 | 99 |
| Temperature | 400 | 400 | 425 | 450 | 450 | 475 | 475 | 475 | 475 | 500 |
| Acetone Recovered, Wt. percent | 34.4 | 10.3 | 23.2 | 23.1 | 31.3 | 23.4 | 27.0 | 24.4 | 9.0 | 9.1 |
| High Boiling Pyridine, Wt. percent [2] | 25.5 | 21.1 | 19.4 | 12.5 | 19.2 | 12.8 | 10.0 | 12.5 | 9.6 | 5.1 |
| 2,4,6-Trimethylpyridine: | | | | | | | | | | |
| Wt. percent [2] | 16.7 | 14.5 | 20.1 | 23.7 | 15.8 | 20.8 | 21.5 | 18.9 | 17.2 | 18.9 |
| Mole percent | 24.0 | 20.9 | 28.9 | 34.1 | 22.7 | 29.9 | 30.9 | 27.2 | 24.8 | 27.2 |

[1] Grams/hour/liter catalyst.
[2] Calculated against acetone not recovered.

It will be evident that my process makes it possible to produce 2,4,6-trimethylpyridine of high purity and substantially free from the contaminants normally found in the product derived from coal tar.

Having disclosed the details of my invention, I claim:

1. The process of making 2,4,6-trimethylpyridine which comprises passing vapors of acetone and ammonia in weight ratio between 10/1 and 2/1 over a silica-alumina catalyst containing between 5% and 50% by weight of alumina and 95% to 50% by weight of silica at a temperature from about 300° C. to about 550° C.

2. The process of making 2,4,6-trimethylpyridine as defined in claim 1 wherein the temperature is about 450° C.

3. The process of making 2,4,6-trimethylpyridine which comprises passing vapors of acetone and ammonia in weight ratio of between 4/1 to 6/1 over a silica-alumina catalyst containing between 7% and 25% by weight of alumina and 93% to 75% by weight of silica at a temperature of about 450° C.

References Cited in the file of this patent

UNITED STATES PATENTS 2,523,580     Mahan _____ Sept. 26, 1950

OTHER REFERENCES

Frank et al.: J. A. C. S., vol. 71, pages 2629–2635 (1949).

Riehm, Beilstein, Handbook of Organic Chem., 4th ed., vol. 1 page 642 (1918).